(12) United States Patent
Kida

(10) Patent No.: US 9,609,151 B2
(45) Date of Patent: *Mar. 28, 2017

(54) IMAGE FORMING APPARATUS THAT DELIVERS IMAGE DATA DISPLAYED ON DIGITAL SIGNAGE DEVICES AND COMPUTER-READABLE NON-TRANSITORY MEDIUM WITH IMAGE FORMING CONTROL PROGRAM RECORDED THEREON

(71) Applicant: KYOCERA Document Solutions Inc., Osaka (JP)

(72) Inventor: Yasuhiko Kida, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/941,764

(22) Filed: Nov. 16, 2015

(65) Prior Publication Data

US 2016/0142565 A1    May 19, 2016

(30) Foreign Application Priority Data

Nov. 17, 2014 (JP) ................. 2014-232834

(51) Int. Cl.
*G06K 15/02*    (2006.01)
*H04N 1/00*    (2006.01)

(52) U.S. Cl.
CPC ....... *H04N 1/00307* (2013.01); *H04N 1/0097* (2013.01); *H04N 1/00938* (2013.01); *H04N 2201/0094* (2013.01)

(58) Field of Classification Search
CPC .................. H04N 1/00095; H04N 1/00127
See application file for complete search history.

(56) References Cited

U.S. PATENT DOCUMENTS

2003/0090574 A1    5/2003  Seaman
2010/0214323 A1*   8/2010  Sakaue ............... H04N 9/3179
                                              345/661

(Continued)

FOREIGN PATENT DOCUMENTS

JP    2008193588 A    8/2008
JP    2013-125147 A   6/2013

(Continued)

OTHER PUBLICATIONS

Notice of Reasons for Refusal mailed by Japan Patent Office on Sep. 27, 2016 in the corresponding Japanese patent application No. 2014-232834.

*Primary Examiner* — Benny Q Tieu
*Assistant Examiner* — Haris Sabah
(74) *Attorney, Agent, or Firm* — IP Business Solutions, LLC

(57) ABSTRACT

An image forming apparatus includes an image reading section, a storage section, a communication section, an acceptance section, and an operation control section. The storage section has a plurality of storage regions at least one or more of which are signage-specific storage regions associated one-to-one with the one or more digital signage devices. Each of the signage-specific storage regions stores the image data generated by the image reading section having read the original document. The operation control section is further configured to, when the acceptance section accepts the delivery instruction, allow the communication section to send the image data stored in the signage-specific storage region associated with the individual digital signage device designated in the delivery instruction to the digital signage device designated in the delivery instruction and allow the storage section to store the delivery instruction as (Continued)

history information in the associated signage-specific storage region.

13 Claims, 12 Drawing Sheets

(56) References Cited

U.S. PATENT DOCUMENTS

| | | | | |
|---|---|---|---|---|
| 2010/0332464 A1* | 12/2010 | Iwai | ................. | G06F 17/30864 |
| | | | | 707/707 |
| 2013/0117473 A1* | 5/2013 | Hyo | ................... | H04N 1/00344 |
| | | | | 710/18 |
| 2014/0333963 A1* | 11/2014 | Nakamura | .............. | H04L 67/16 |
| | | | | 358/1.15 |

FOREIGN PATENT DOCUMENTS

| | | | |
|---|---|---|---|
| JP | 2013125147 A | | 6/2013 |
| JP | 2014127867 A | | 7/2014 |

* cited by examiner

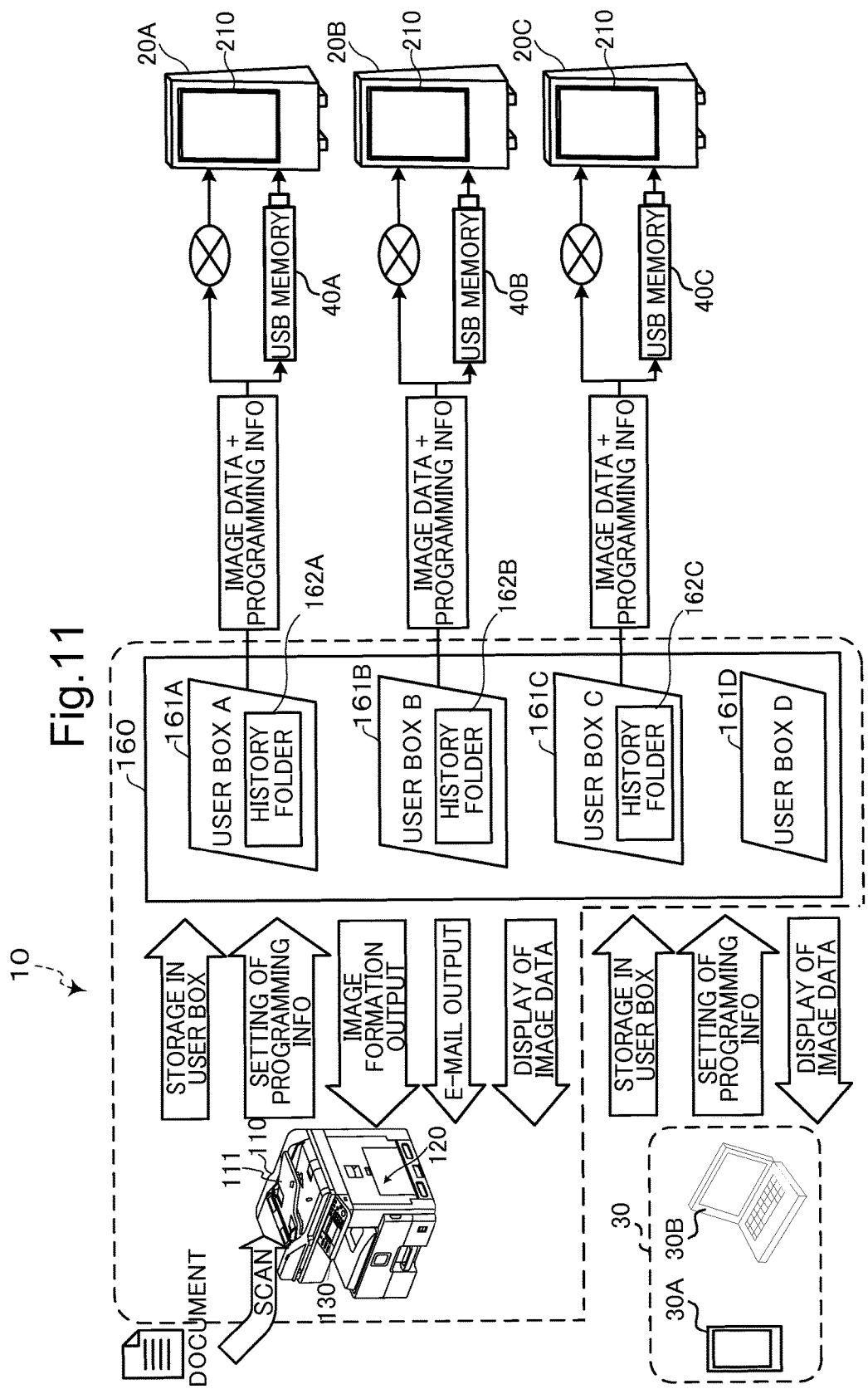

IMAGE FORMING APPARATUS THAT DELIVERS IMAGE DATA DISPLAYED ON DIGITAL SIGNAGE DEVICES AND COMPUTER-READABLE NON-TRANSITORY MEDIUM WITH IMAGE FORMING CONTROL PROGRAM RECORDED THEREON

INCORPORATION BY REFERENCE

This application claims priority to Japanese Patent Application No. 2014-232834 filed on Nov. 17, 2014, the entire disclosure of which is incorporated herein by reference.

BACKGROUND

The present disclosure relates to image forming apparatuses and computer-readable non-transitory recording media with an image forming apparatus control program recorded thereon and particularly relates to a technique for delivering image data to external digital signage devices.

In recent years digital signage devices are becoming widespread as means for giving notice to many people of information in public facilities and so on. By generating and registering image data or the like for information on a dedicated management server provided externally of a digital signage device, an operator can change the contents of an informing image to be displayed on the digital signage device. Thus, as compared to conventional informing means, such as a notice and a notice board (bulletin board), the digital signage device can avoid the trouble of having to remake the contents of information, which makes it easy to offer up-to-data information.

SUMMARY

A technique improved over the aforementioned technique is proposed as one aspect of the present disclosure.

An image forming apparatus according to an aspect of the present disclosure includes an image reading section, a storage section, a communication section, an acceptance section, and an operation control section. The image reading section is operable to read an original document and generate image data from the read original document. The storage section is operable to store the image data generated by the image reading section. The communication section is operable to communicate data with one or more external digital signage devices. The acceptance section is configured to accept a delivery instruction to deliver the image data with the one or more digital signage devices designated as destinations. The operation control section is configured to control the operation of reading the original document and generating the image data performed by the image reading section, the operation of communicating data performed by the communication section, and the operation of storing the image data performed by the storage section.

The storage section has a plurality of storage regions at least one or more of which are signage-specific storage regions associated one-to-one with the one or more digital signage devices.

Each of the signage-specific storage regions stores the image data generated by the image reading section having read the original document.

The operation control section is further configured to, when the acceptance section accepts the delivery instruction, allow the communication section to send the image data stored in the signage-specific storage region associated with the individual digital signage device designated in the delivery instruction to the digital signage device designated in the delivery instruction and allow the storage section to store the delivery instruction as history information in the associated signage-specific storage region.

A computer-readable non-transitory recording medium according to another aspect of the present disclosure contains an image forming apparatus control program recorded thereon, the image forming apparatus control program allowing a computer to function as the above-described operation control section and the above-described acceptance section.

BRIEF DESCRIPTION OF THE DRAWINGS

FIG. 11 is a diagram schematically showing a processing flow in a digital signage system according to Modification 2.

DETAILED DESCRIPTION

Hereinafter, a description will be given of an image forming apparatus and a computer-readable non-transitory recording medium with an image forming apparatus control program recorded thereon, both according to one embodiment of the present disclosure, with reference to the drawings.

Figure 1:
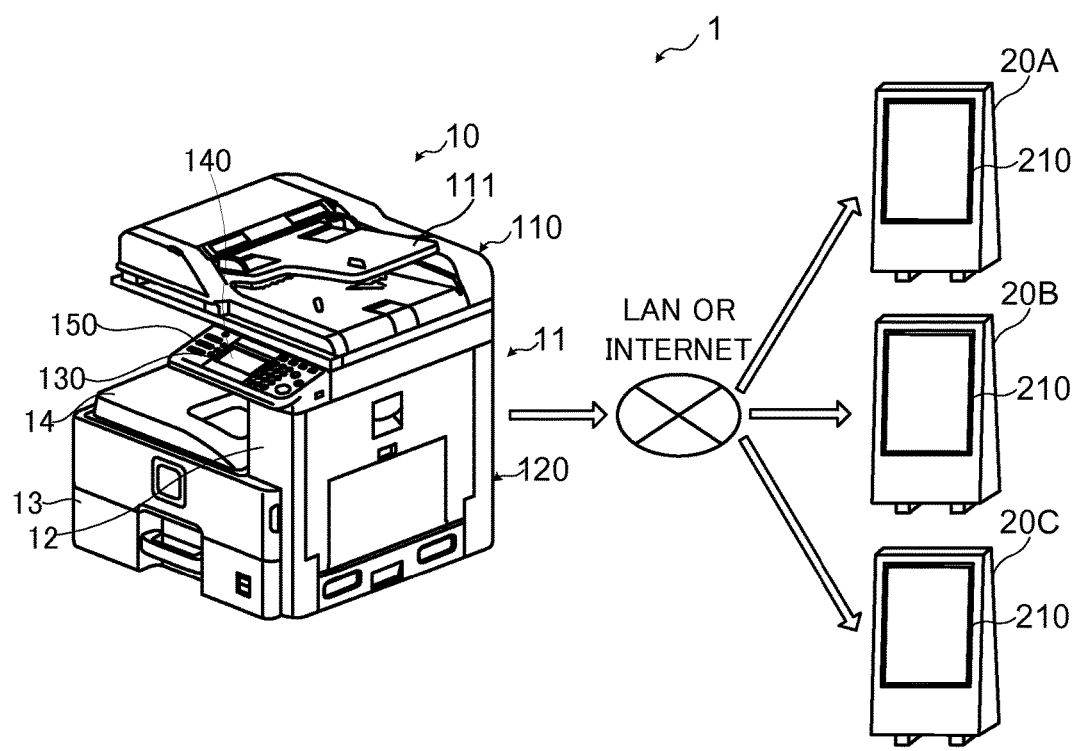
FIG. 1 is a view showing a schematic configuration of a digital signage system according to one embodiment of the present disclosure.
Figure 2:
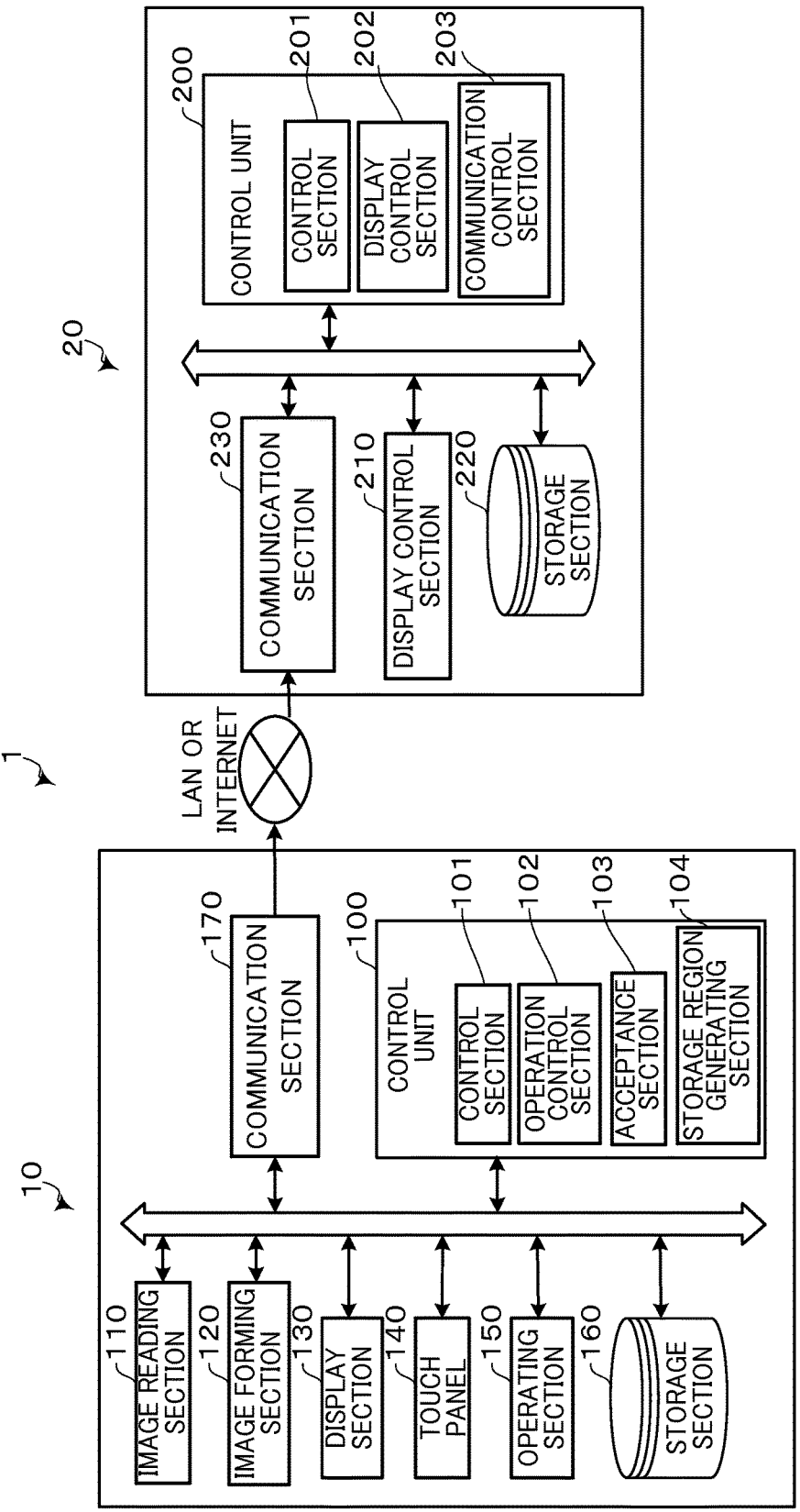
FIG. 2 is a block diagram showing an internal configuration of the digital signage system according to the one embodiment of the present disclosure.

FIG. 1 is a view showing a schematic configuration of a digital signage system according to one embodiment of the present disclosure. FIG. 2 is a block diagram showing an internal configuration of the digital signage system according to the one embodiment of the present disclosure.

The digital signage system 1 includes an image forming apparatus 10 and a plurality of digital signage devices 20A, 20B and 20C connected via a LAN (local area network) or the like to the image forming apparatus 10. The image forming apparatus 10 is configured to send to the digital signage devices 20A, 20B and 20C image data generated by an image reading section 110 having read an original document, together with programming information (setting data) indicating a setting of how the digital signage devices 20A, 20B and 20C display the image data.

Note that the digital signage devices 20A, 20B and 20C have the same configuration and, therefore, unless otherwise distinguished, they and each of them are indicated at 20 from which "A", "B", and "C" are omitted.

The image forming apparatus 10 is a multifunction peripheral having multiple functions including, for example, a copy function, a print function, a scan function, and a facsimile function. The image forming apparatus 10 is roughly composed of an apparatus body 11, the image reading section 110 disposed above the apparatus body 11, and a connecting portion 12 provided between the image reading section 110 and the apparatus body 11.

The apparatus body 11 is made up to include an image forming section 120, a sheet feed section 13, and so on.

In an image forming operation of the image forming apparatus 10, the image forming section 120 forms a toner image on a recording paper sheet fed from the sheet feed section 13 based on image data generated by the image reading section 110 having read an original document placed on a document feeding tray 111 or other image data. Thereafter, the toner image formed on the recording paper sheet is heat fixed by an unshown fixing section. The recording paper sheet having an image fixed thereon by the completion of the fixing is discharged to a sheet output tray 14.

A display section 130 and an operating section 150 are disposed at the front of a housing forming a shell of the image forming apparatus 10. The display section 130 is formed to include a liquid crystal display (LCD) or an organic light-emitting diode (OLED) display.

A touch panel 140 is disposed in front of the display section 130. The touch panel 140 is a touch panel of, for example, a so-called resistive film system or a capacitance system and is configured to detect a user's touch of the touch panel 140 together with the point of touch. When detecting the user's touch, the touch panel 140 outputs a detection signal indicating a coordinate point of the point of touch.

The operating section 150 is hard keys including, for example, a menu key for calling up a menu, arrow keys for moving the focus of a GUI forming the menu, a determination key for performing a determination operation for the GUI forming the menu, and so on.

A storage section 160 is a large storage device, such as an HDD (hard disk drive), and is configured to store, for example, image data generated by the image reading section 110.

A communication section 170 is a network interface composed of a communication module, such as a LAN board.

The image forming apparatus 10 further includes a control unit 100. The control unit 100 is composed of a CPU (central processing unit), a RAM (random access memory), a ROM (read only memory), and so on. When an image forming apparatus control program stored in the above ROM or the storage section 160 is executed by the above CPU, the control unit 100 functions as a control section 101, an operation control section 102, an acceptance section 103, and a storage region generating section 104. Alternatively, each of the control section 101, the operation control section 102, the acceptance section 103, and the storage region generating section 104 of the control unit 100 may not be implemented by the operation of the control unit 100 in accordance with the image forming apparatus control program but may be constituted by a hardware circuit.

The control section 101 governs the overall control of the image forming apparatus 10.

The operation control section 102 governs the operation control of the image forming apparatus 10. The operation control section 102 is connected to the image reading section 110, the image forming section 120, the display section 130, the storage section 160, the communication section 170, and so on and performs the operation control of the above components connected thereto. The details of processing of the operation control section 102 will be described hereinafter.

The acceptance section 103 has the function of accepting, based on a detection signal output from the touch panel 140, a user's gesture on the touch panel 140. Furthermore, the acceptance section 103 also has the function of accepting a user's operation using the operating section 150, such as a hardware key.

The storage region generating section 104 has the function of, when the acceptance section 103 accepts a generation instruction to generate a storage region (signage-specific storage region) associated with a digital signage device 20, generating in the storage section 160 a signage-specific storage region associated one-to-one with the digital signage device 20. When a new digital signage device 20 is introduced, an operator can enter the above generation instruction using the operating section 150 or so on to generate in the storage section 160 a signage-specific storage region associated one-to-one with the new digital signage device 20. Thus, the new digital signage device 20 is registered in the image forming apparatus 10. As a result, it becomes possible for the image forming apparatus 10 to generate and register image data and so on for the new digital signage device 20 and it becomes possible to use the image forming apparatus 10 to change the contents of an informing image to be displayed on the new digital signage device 20.

The storage section 160 has a plurality of storage regions and at least one or more of them are associated one-to-one with digital signage devices 20. In an example shown in FIG. 4, there are three user boxes from 161A to 161C as signage-specific storage regions and one user box 161D as a non-signage-specific storage region in the storage section 160. The user box 161A is associated with the digital signage device 20A, the user box 161B is associated with the digital signage device 20B, and the user box 161C is associated with the digital signage device 20C. In contrast, the user box 161D is not associated with any digital signage device 20.

Furthermore, each signage-specific storage region is internally provided with a history information storage subregion which is a region for storing history information to be described hereinafter. In the example shown in FIG. 4, history folders from 162A to 162C are provided as history information storage subregions in the user boxes from 161A to 161C, respectively. The history folder 162A is associated with the digital signage device 20A, the history folder 162B is associated with the digital signage device 20B, and the history folder 162C is associated with the digital signage device 20C.

Next, a description will be given of the structure and configuration of each digital signage device 20. The digital signage device 20 includes a control unit 200, a display section 210, a storage section 220, a communication section 230, and so on. The display section 210 is formed of a liquid crystal display, an organic light-emitting diode display or the like. The storage section 220 is a large storage device, such as an HDD. The communication section 230 is a network interface composed of a communication module, such as a LAN board.

The control unit 200 is composed of a CPU, a RAM, a ROM, and so on. When a control program stored in the above ROM or the storage section 220 is executed by the above CPU, the control unit 200 functions as a control section 201, a display control section 202, and a communication control section 203. Alternatively, each of the control section 201, the display control section 202, and the communication control section 203 of the control unit 200 may not be implemented by the operation of the control unit 200 in accordance with the control program but may be constituted by a hardware circuit.

The control section 201 governs the overall operation control of the digital signage device 20.

The communication control section 203 has the function of controlling the communication operation of the communication section 230. Specifically, the communication control section 203 allows the communication section 230 to receive image data and programming information sent from the image forming apparatus 10.

The display control section 202 has the function of controlling the display operation of the display section 210. Specifically, the display control section 202 analyzes programming information received by the communication section 230 and, based on the analysis result, allows the display section 210 to display image data received by the communication section 230.

The above is the description of the configuration of the digital signage system 1. Subsequently, a description will be given of processing for delivering image data in the digital signage system 1 with reference to FIGS. 3 and 4.

Figure 3:
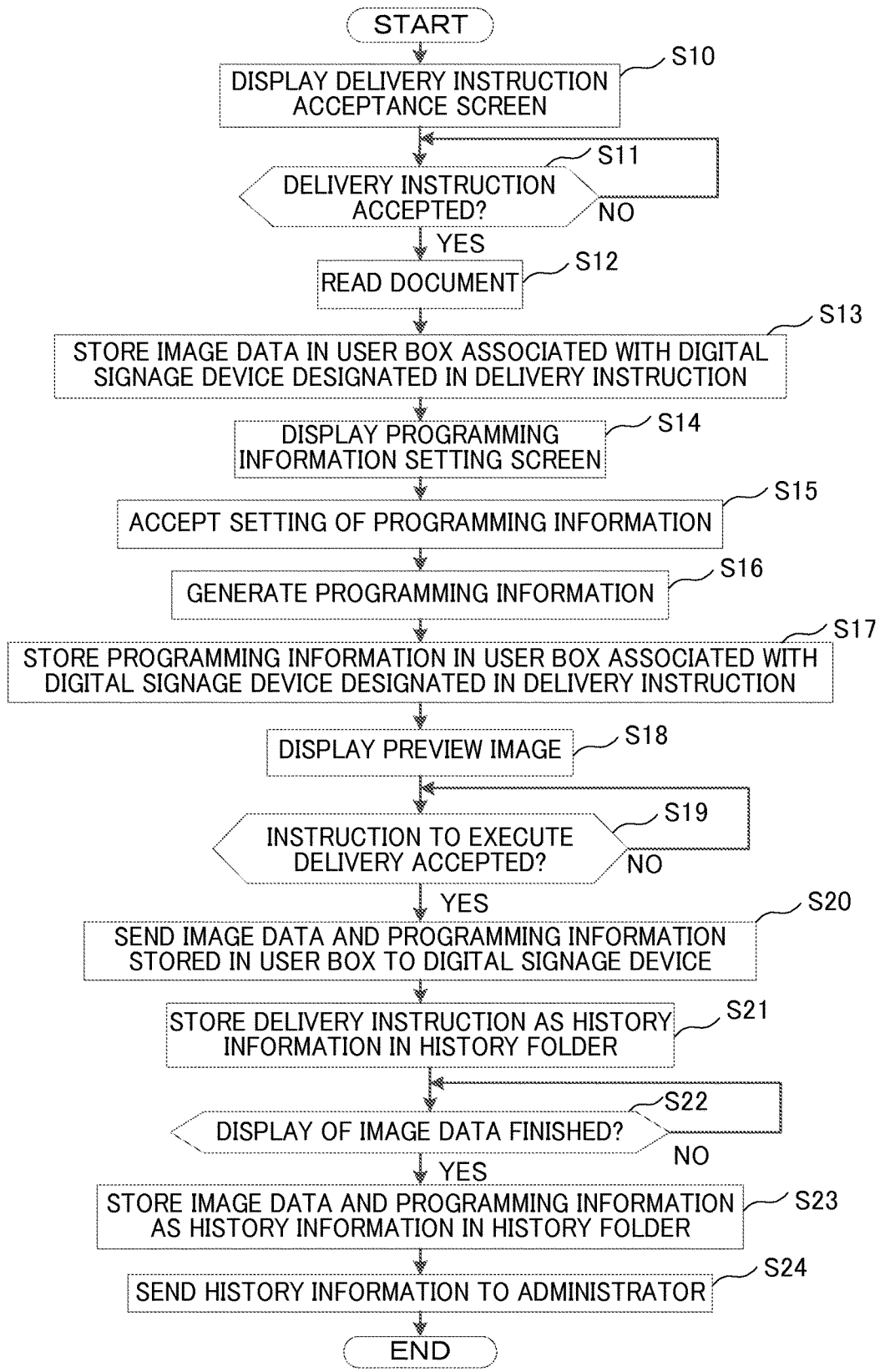
FIG. 3 is a flowchart showing a flow of processing for delivering image data in an image forming apparatus according to the one embodiment of the present disclosure.
Figure 4:
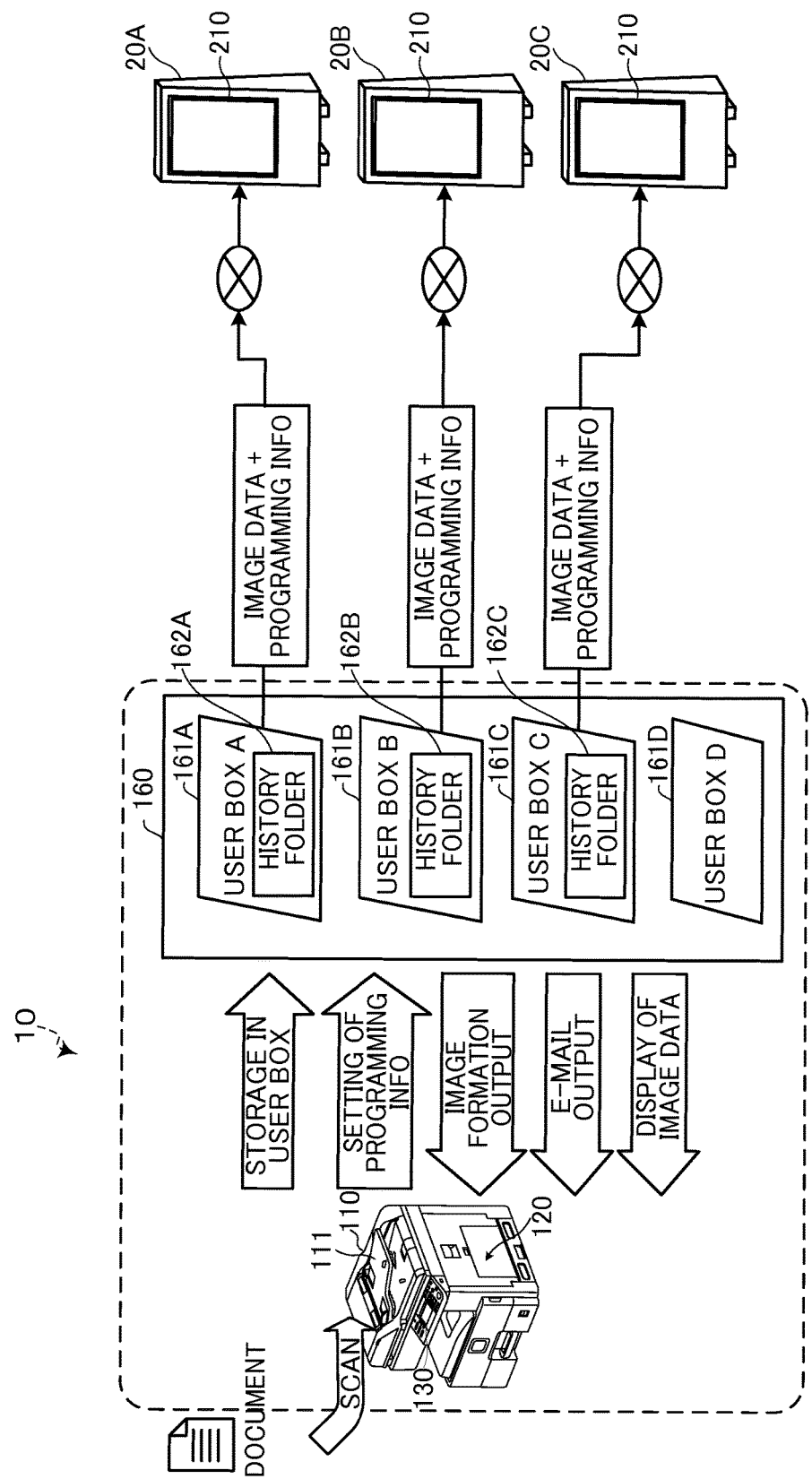
FIG. 4 is a diagram schematically showing a processing flow in the digital signage system according to the one embodiment of the present disclosure.

FIG. 3 is a flowchart showing a flow of processing for delivering image data in the image forming apparatus 10 according to the one embodiment of the present disclosure. FIG. 4 is a diagram schematically showing a processing flow in the digital signage system 1 according to the one embodiment of the present disclosure.

The operation control section 102 allows the display section 130 to display a predetermined delivery instruction acceptance screen (step S10). The acceptance section 103 determines, on the delivery instruction acceptance screen, whether or not to have accepted a delivery instruction (step S11).

Figure 5:
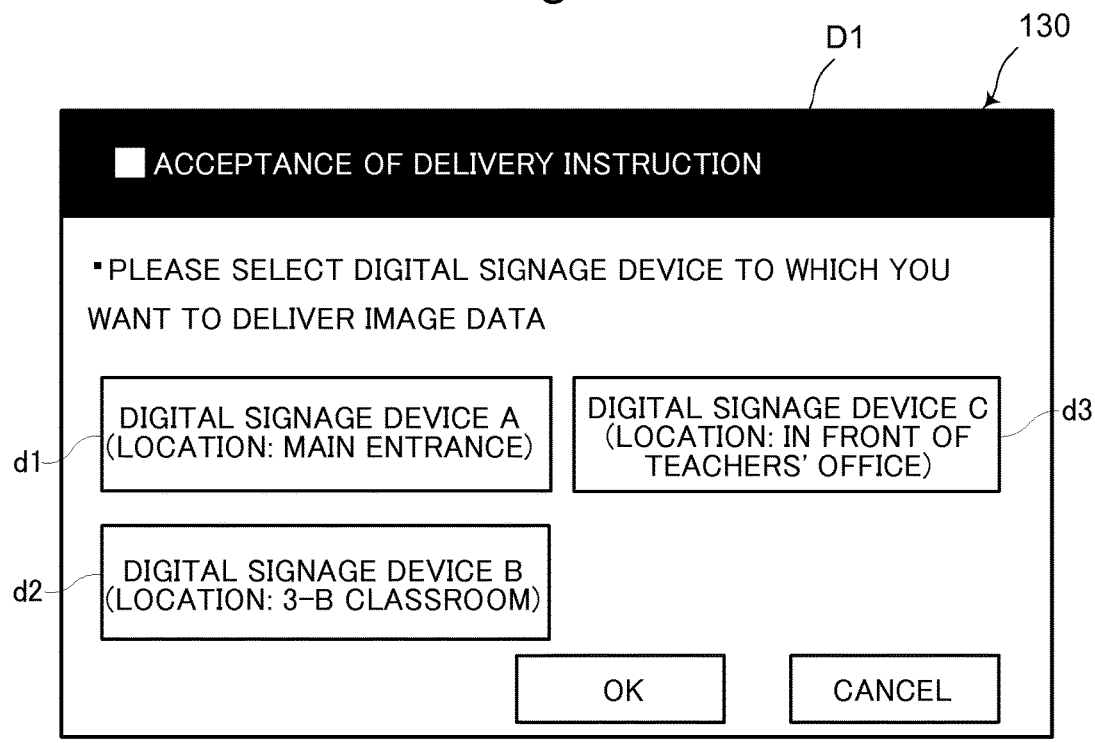
FIG. 5 is a view showing an example of a delivery instruction acceptance screen displayed on a display section of the image forming apparatus according to the one embodiment of the present disclosure.

FIG. 5 is a view showing an example of a delivery instruction acceptance screen displayed on the display section 130. In an example shown in FIG. 5, a list of digital signage devices 20 connected to the image forming apparatus 10 is displayed, together with their locations of installation, on the delivery instruction acceptance screen D1. Furthermore, a plurality of buttons from d1 to d3 are arranged on the delivery instruction acceptance screen D1. An operator pushes any buttons from d1 to d3 using the touch panel 140 or the operating section 150 to enter a delivery instruction to deliver image data. The acceptance section 103 accepts a delivery instruction designating as destinations the respective digital signage devices 20 corresponding to the one or more buttons pushed by the operator.

When the acceptance section 103 accepts the delivery instruction (YES in step S11), the operation control section 102 allows the image reading section 110 to read (scan) an original document placed on the document feeding tray 111 (step S12). Then, the operation control section 102 allows the storage section 160 to store the image data generated by the image reading section 110 having read the original document in the one or more respective signage-specific storage regions (user boxes) associated with the one or more digital signage devices 20 designated in the delivery instruction accepted by the acceptance section 103 (step S13). In the case where a plurality of original documents are placed on the document feeding tray 111, the image reading section 110 sequentially scans the plurality of original documents to generate respective pieces of image data for the original documents.

After the storage section 160 stores the image data, the operation control section 102 allows the display section 130 to display a predetermined programming information acceptance screen (setting screen) (step S14). The acceptance section 103 accepts a setting of programming information based on a user's operation entered on the predetermined programming information acceptance screen (setting screen) (step S15).

Figure 6A:
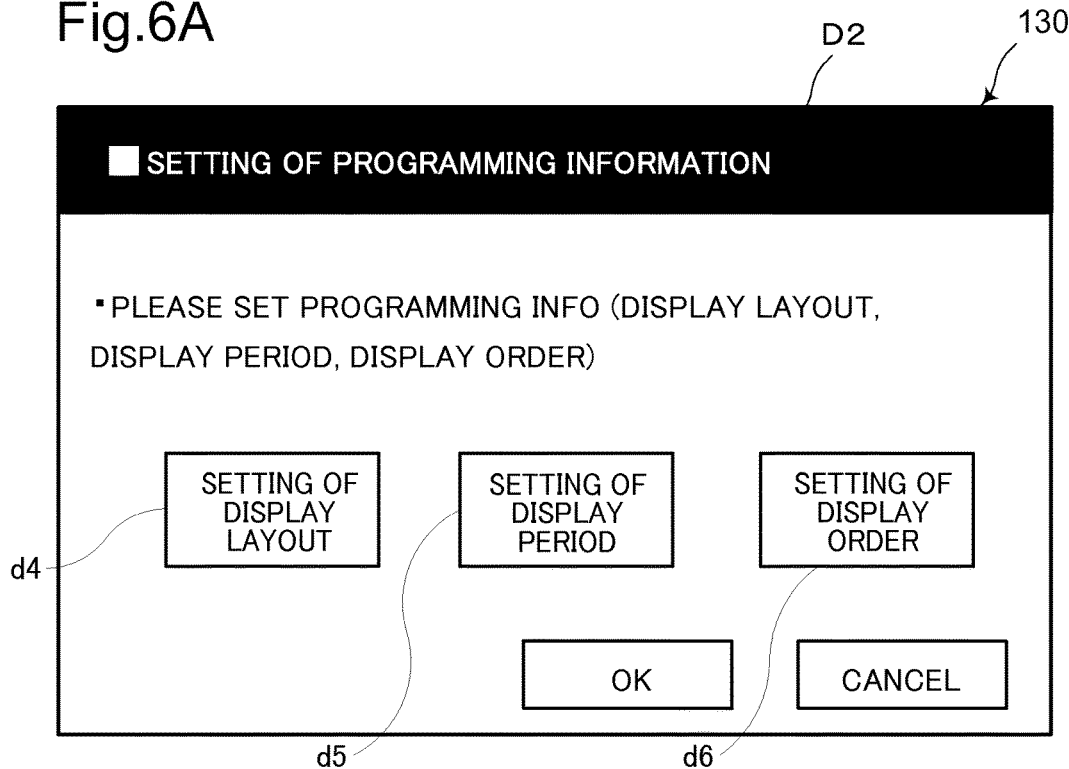
FIG. 6A is a view showing an example of a programming information acceptance screen displayed on the display section of the image forming apparatus according to the one embodiment of the present disclosure.

FIG. 6A is a view showing an example of a programming information acceptance screen displayed on the display section 130. In an example shown in FIG. 6A, a plurality of buttons from d4 to d6 are arranged on the programming information acceptance screen D2.

When the button d4 is pushed by the operator, the acceptance section 103 accepts a setting of the display layout of image data as a setting of programming information. The setting of the display layout of image data herein refers to a setting indicating where image data is to be displayed on the display section 210 of the relevant digital signage device 20.

Figure 6B:
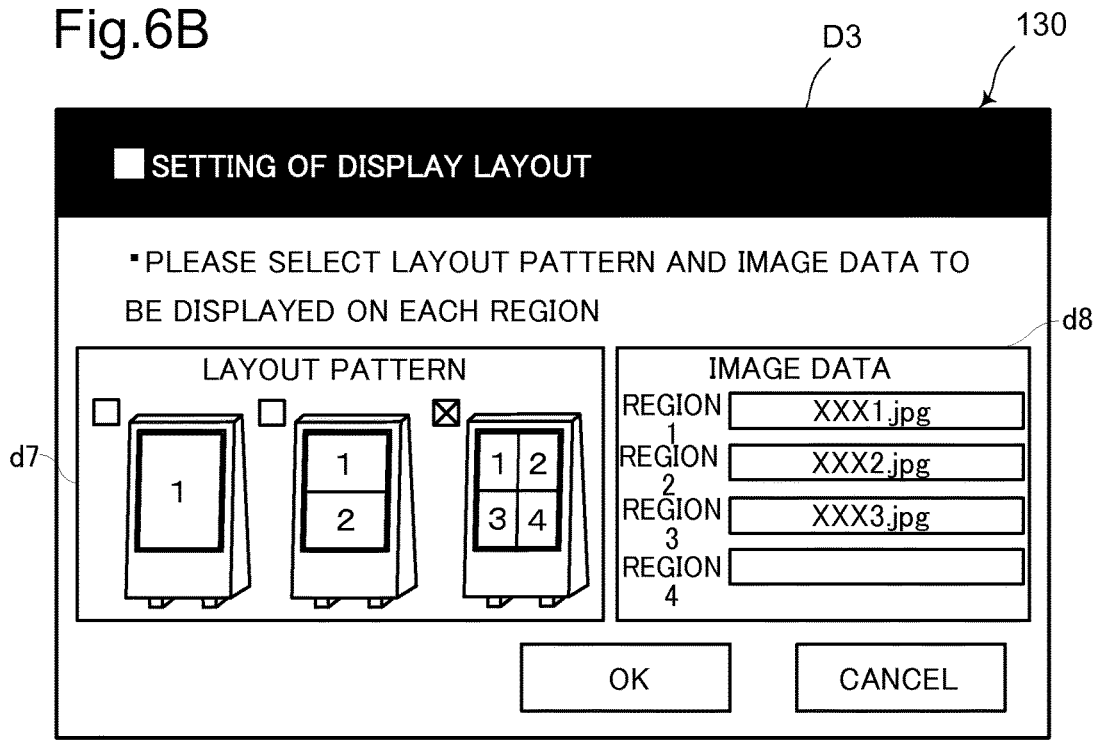
FIG. 6B is a view showing an example of a layout acceptance screen displayed on the display section.

FIG. 6B is a view showing an example of a display layout acceptance screen displayed on the display section 130. In an example shown in FIG. 6B, a display layout pattern acceptance screen d7 and an image data setting screen d8 are shown on the display layout acceptance screen D3. Three display layouts are presented as display layout patterns for a display region of the display section 210 on the display layout pattern acceptance screen d7. The three display layouts include: a display layout where the display region is not divided (left); a display layout where the display region is divided into two subregions (middle); and a display layout where the display region is divided into four subregions (right). The acceptance section 103 accepts, based on a user's operation entered using the touch panel 140 or the operating section 150, one of the three display layouts presented on the display layout pattern acceptance screen d7 as the display layout pattern for the display region of the display section 210. Furthermore, one or more pieces of image data capable of being displayed on the entire display region or each display subregion of the display section 210 are indicated on the image data setting screen d8. The acceptance section 103 accepts, based on a user's operation entered using the touch panel 140 or the operating section 150, the designation of a piece of image data to be displayed on the entire display region or each display subregion of the display section 210 from among all of one or more pieces of image data stored in the associated signage-specific storage region of the storage section 160.

Referring back to FIG. 6A, when the button d6 is pushed by the operator, the acceptance section 103 accepts a setting of the display order of pieces of image data as a setting of programming information. The setting of the display order of pieces of image data herein refers to a setting indicating in which order pieces of image data are to be displayed on the display section 210 of the relevant digital signage device 20.

Figure 7A:
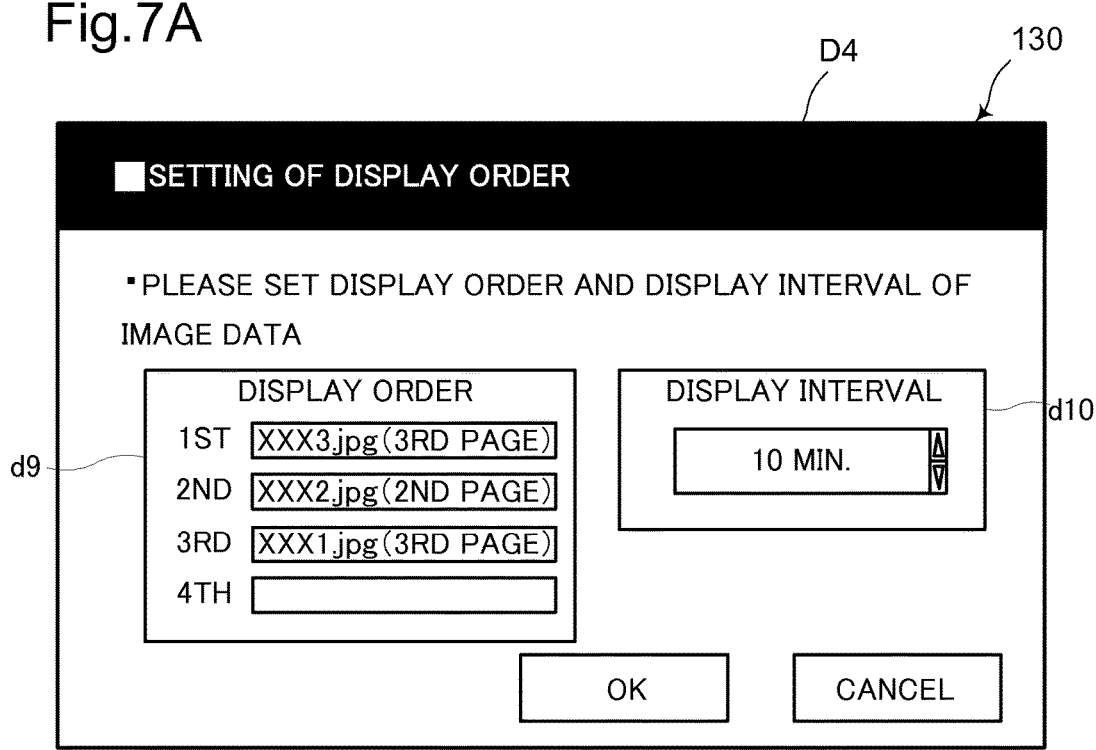
FIG. 7A is a view showing an example of a display order acceptance screen displayed on the display section of the image forming apparatus according to the one embodiment of the present disclosure.

FIG. 7A is a view showing an example of a display order acceptance screen displayed on the display section 130. In an example shown in FIG. 7A, an image data acceptance screen d9 and a display interval acceptance screen d10 are shown on the display order acceptance screen D4. Pieces of image data capable of being displayed at each position of the display order are indicated on the image data acceptance screen d9. The acceptance section 103 accepts, based on a user's operation entered using the touch panel 140 or the operating section 150, the designation of a piece of image data to be displayed at each position of the display order from among the pieces of image data stored in the associated signage-specific storage region of the storage section 160. Furthermore, various options of the time interval at which the display of image data on the relevant digital signage device 20 can be switched are presented on the display interval acceptance screen d10. The acceptance section 103 accepts the designation of a time interval based on a user's operation entered using the touch panel 140 or the operating section 150.

Referring back to FIG. 6A, when the button d5 is pushed by the operator, the acceptance section 103 accepts a setting of the display period of image data as a setting of programming information. The setting of the display period of image data herein refers to a setting indicating how long the image data is to be displayed on the relevant digital signage device 20.

Figure 7B:
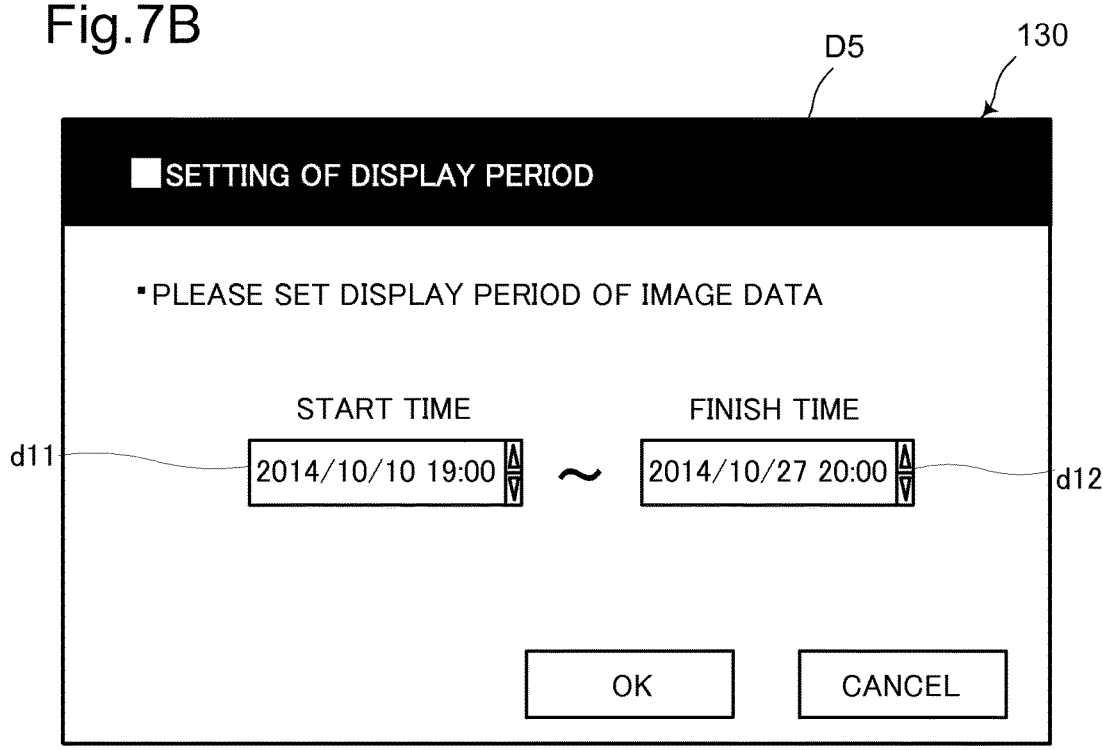
FIG. 7B is a view showing an example of a display period acceptance screen displayed on the display section.

FIG. 7B is a view showing an example of a display period acceptance screen displayed on the display section 130. In an example shown in FIG. 7B, a start time indication field d11 indicating the start time of display of image data and a finish time indication field d12 indicating the finish time of display of image data are shown on the display period acceptance screen D5. The acceptance section 103 accepts the designations of a start time of display of image data and a finish time of display of image data, each based on a user's operation entered using the touch panel 140 or the operating section 150.

In the above manners, when the acceptance section 103 accepts at least one of the setting of the layout of image data, the setting of the display order of pieces of image data, and the setting of the display period of image data as a setting of programming information, the operation control section 102 generates programming information based on the accepted setting (step S16).

Then, the operation control section 102 allows the storage section 160 to store the programming information generated in the processing at step S16 in the respective signage-specific storage regions associated with the one or more digital signage devices 20 designated in the delivery instruction accepted by the acceptance section 103 (step S17). Thus, the one or more signage-specific storage regions of the storage section 160 store image data to be displayed by the one or more respective digital signage devices 20 and programming information indicating a setting of how the one or more digital signage devices 20 display the image data.

The operation control section 102 allows the display section 130 to display, based on the image data and programming information stored in each signage-specific storage region of the storage section 160, a preview image indicating a display screen to be displayed on the relevant digital signage device 20 (step S18).

Thereafter, when the acceptance section 103 accepts an instruction to execute delivery (YES in step S19), the operation control section 102 allows the communication section 170 to deliver the image data by sending the image data and the programming information both stored in the signage-specific storage region to the relevant digital signage device 20 (step S20).

After the delivery of the image data, the operation control section 102 allows the storage section 160 to store the delivery instruction, which has been accepted by the acceptance section 103 in the processing at step S11, in the respective history information storage subregions of the signage-specific storage regions associated with the one or more digital signage devices 20 designated in the delivery instruction (step S21). In other words, in the processing at step S21, the operation control section 102 allows the storage region 160 to store the delivery instruction as history information. The delivery instruction stored as history information by the storage section 160 contains various information, including the file name of the image data to be delivered, the names of the one or more relevant digital signage devices 20 as destinations for delivery, the delivery time, and the person who entered the delivery instruction.

After the processing at step S21, the operation control section 102 analyzes the programming information stored in each relevant signage-specific storage region to determine whether or not the relevant digital signage device 20 has finished displaying the image data (step S22).

If the relevant digital signage device 20 has finished displaying the image data (YES in step S22), the operation control section 102 allows the image data and the programming information, which have been stored in the associated signage-specific storage region in the processing at step S13 and the processing at step S17, respectively, to be moved (stored) into the history information storage subregion (history folder) of the associated signage-specific storage region (step S23). In other words, in the processing at step S23, the operation control section 102 allows the storage region 160 to store as history information both the image data and the programming information.

In the processing at step S13 and the processing at step S17, the operation control section 102 may allow the image data and the programming information, respectively, to be stored in a dedicated storage subregion (for example, an in-display folder) provided in each relevant signage-specific storage region. In this case, in the processing at step S23, the operation control section 102 allows the image data and the programming information to be moved from the in-display folder to the history folder in the same signage-specific storage region.

After the processing at step S23, the operation control section 102 allows the communication section 170 to send to the administrator the history information stored in the history information storage subregion in the processing at step S21 and the processing at step S23 (step S24). The storage section 160 previously stores the e-mail address of the administrator. The communication section 170 sends an e-mail containing the history information to the address stored in the storage section 160. The processing at step S24 may be executed just after the processing at step S21.

A general digital signage system requires a dedicated management server separately from digital signage devices. The generation and delivery operation of image data and so on on the dedicated management server are often complicated. Furthermore, also in checking the delivery history of image data, a specific operation is required on the dedicated management server. Future digital signage devices can be considered to be introduced not only into large facilities, such as station yards, but also into relatively small facilities, such as schools. However, it is difficult to install a dedicated management server in small facilities. In addition, because in small facilities it is difficult to put a dedicated staff for managing a digital signage device, the method for operating the digital signage device should preferably be simple.

To cope with the above problems, the image forming apparatus 10 according to the one embodiment of the present disclosure includes signage-specific storage regions associated one-to-one with digital signage devices 20 and can register image data to be displayed on each digital signage device 20 by allowing the associated signage-specific storage region to store image data generated by the image reading section 110 having read an original document. The operator can register image data to be displayed on each digital signage device 20 with a simple operation, as before, of designating a destination for storage of the image data and scanning an original document.

Furthermore, the image forming apparatus 10 according to the one embodiment of the present disclosure can set, with a simple operation on the image forming apparatus 10, not only image data but also programming information indicating a setting of how the image data is to be displayed on the relevant digital signage device 20. In addition, in the image forming apparatus 10 according to the one embodiment of the present disclosure, a set of image data and programming information is stored in each of signage-specific storage regions associated one-to-one with the digital signage devices 20. Therefore, the operator can easily confirm or change the contents of the image data and programming information later.

In the image forming apparatus 10 according to the one embodiment of the present disclosure, deliver instructions to deliver image data are stored (accumulated) as history information in each signage-specific storage region. Therefore, the operator can easily check the history of the delivery instructions later. Furthermore, in the image forming apparatus 10 according to the one embodiment of the present disclosure, a set of image data and programming information is stored (accumulated) as history information in each relevant signage-specific storage region every time the associated digital signage device 20 has finished displaying the image data. Therefore, the operator can easily check the previously delivered image data and programming information later.

In the image forming apparatus 10 according to the one embodiment of the present disclosure, the signage-specific storage regions associated one-to-one with digital signage devices 20 are internally provided with their respective dedicated storage subregions (history information storage subregions) for storing history information. Furthermore, in the image forming apparatus 10 according to the one embodiment of the present disclosure, a set of image data and programming information stored in each signage-specific storage region is moved to the history information storage subregion of the same signage-specific storage region after the associated digital signage device 20 has finished displaying the image data. Therefore, the operator can easily determine whether or not a desired digital signage device 20 is presently displaying image data by checking the signage-specific storage region associated one-to-one with the desired digital signage device 20.

In the image forming apparatus 10 according to the one embodiment of the present disclosure, the administrator for the digital signage system 1 can be notified of history information, such as a delivery instruction. This makes it easy for the administrator to manage the digital signage system 1.

Next, a description will be given of processing for outputting image data in the digital signage system 1 with reference to FIGS. 8 and 4.

Figure 8:
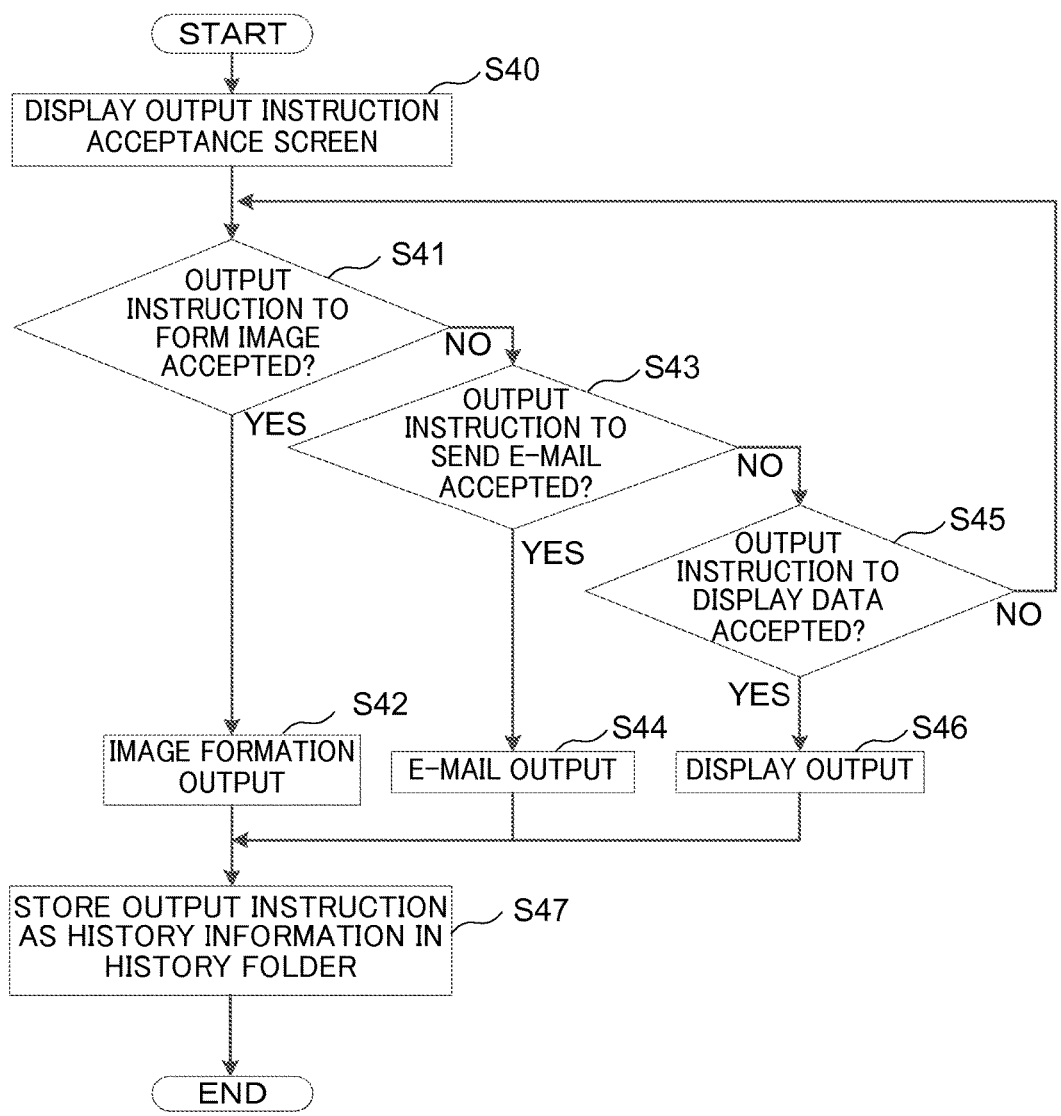
FIG. 8 is a flowchart showing a flow of processing for outputting image data in the image forming apparatus according to the one embodiment of the present disclosure.

FIG. 8 is a flowchart showing a flow of processing for outputting image data in the image forming apparatus 10 according to the one embodiment of the present disclosure.

The operation control section 102 allows the display section 130 to display a predetermined output instruction acceptance screen (step S40). The acceptance section 103 accepts an output instruction on the output instruction acceptance screen (step S41, S43 or S45).

Figure 9:
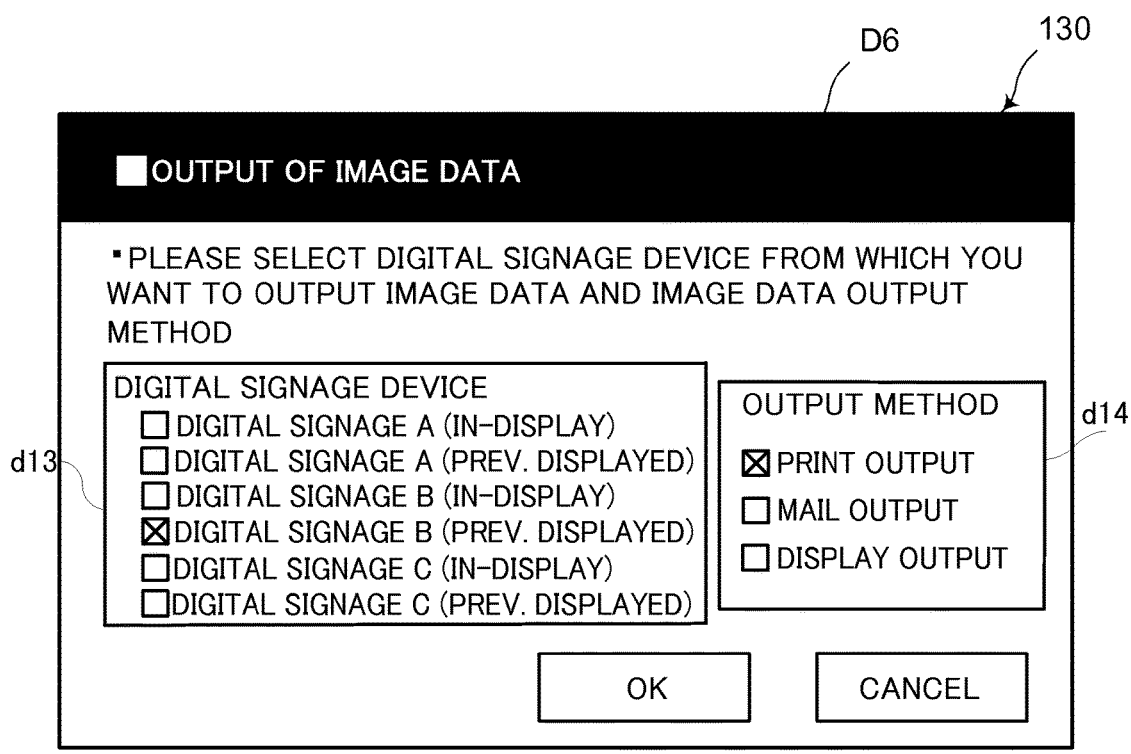
FIG. 9 is a view showing an example of an output instruction acceptance screen displayed on the display section of the image forming apparatus according to the one embodiment of the present disclosure.

FIG. 9 is a view showing an example of an output instruction acceptance screen displayed on the display section 130. In an example shown in FIG. 9, an output source acceptance screen d13 for accepting the designation of a digital signage device serving as a source of data output and an output method acceptance screen d14 for accepting the designation of a method for outputting data are shown on the output instruction acceptance screen D6. The output source acceptance screen d13 shows a list of digital signage devices 20 connected to the image forming apparatus 10. The operator can select, for each digital signage device 20, which of in-display image data or previously displayed image data is to be output. The acceptance section 103 accepts the designation of one digital signage device 20 as a source of data output from among the list of digital signage devices 20. Furthermore, the output method acceptance screen d14 shows three output methods including print output, mail output, and display output. The acceptance section 103 accepts the designation of one output method from among the three output methods.

In the example shown in FIG. 9, an output instruction to print out image data previously displayed on the digital signage device B is entered. In this case, image data stored in the history folder 162B of the user box 161B is data to be output (see FIG. 4).

When the acceptance section 103 accepts an output instruction to form an image (YES in step S41), the operation control section 102 allows the image forming section 120 to form an image on a recording paper sheet based on image data stored in the signage-specific storage region associated with the digital signage device 20 designated in the output instruction (step S42). The operation control section 102 may allow the image forming section 120 to form programming information stored in the same signage-specific storage region, together with the image data, on the recording paper sheet.

When the acceptance section 103 accepts an output instruction to send an e-mail (YES in step S43), the operation control section 102 allows the communication section 170 to send an e-mail to which image data stored in the signage-specific storage region associated with the digital signage device 20 designated in the output instruction is attached (step S44). The storage section 160 previously stores the address of the e-mail. The communication section 170 sends the e-mail to the address stored in the storage section 160. The operation control section 102 may allow the communication section 170 to attach programming information stored in the same signage-specific storage region, together with the image data, to the e-mail. Alternatively, when a user enters an e-mail address using the touch panel 140 or the operating section 150 and the acceptance section 103 accepts the e-mail address as a destination, the operation control section 102 may allow the communication section 170 to send the e-mail.

When the acceptance section 103 accepts an output instruction to display data (YES in step S45), the operation control section 102 allows the display section 130 to display image data stored in the signage-specific storage region associated with the digital signage device 20 designated in the output instruction (step S46). The operation control section 102 may allow the display section 130 to display programming information stored in the same signage-specific storage region, together with the image data.

After the processing for outputting the image data, the operation control section 102 allows the output instruction accepted in the processing at step S41, S43 or S45 to be stored in the history information storage subregion of the signage-specific storage region associated with the relevant digital signage device 20 (step S47). In other words, in the processing at step S47, the operation control section 102 allows the storage region 160 to store the output instruction as history information. The output instruction stored as history information by the storage section 160 contains various information, including the file name of the image data to be output, the name of the relevant digital signage device 20, the output time, and the person who entered the output instruction.

As thus far described, the image forming apparatus 10 according to the one embodiment of the present disclosure stores image data and programming information in each of the signage-specific storage regions associated one-to-one with digital signage devices 20 and can output them using the image forming function, the communication function, the display function, or so on with which the image forming apparatus 10 is equipped. Therefore, in the image forming apparatus 10 according to the one embodiment of the present disclosure, information presented on each digital signage device 20 can be output with a simple operation in various output methods.

In the image forming apparatus 10 according to the one embodiment of the present disclosure, output instructions to output image data are stored (accumulated) as history information in each signage-specific storage region. Therefore, the operator can easily check the history of the output instructions later.

The present disclosure is not limited to the configuration of the above embodiment and can be modified in various ways.

<Modification 1>

Figure 10A:
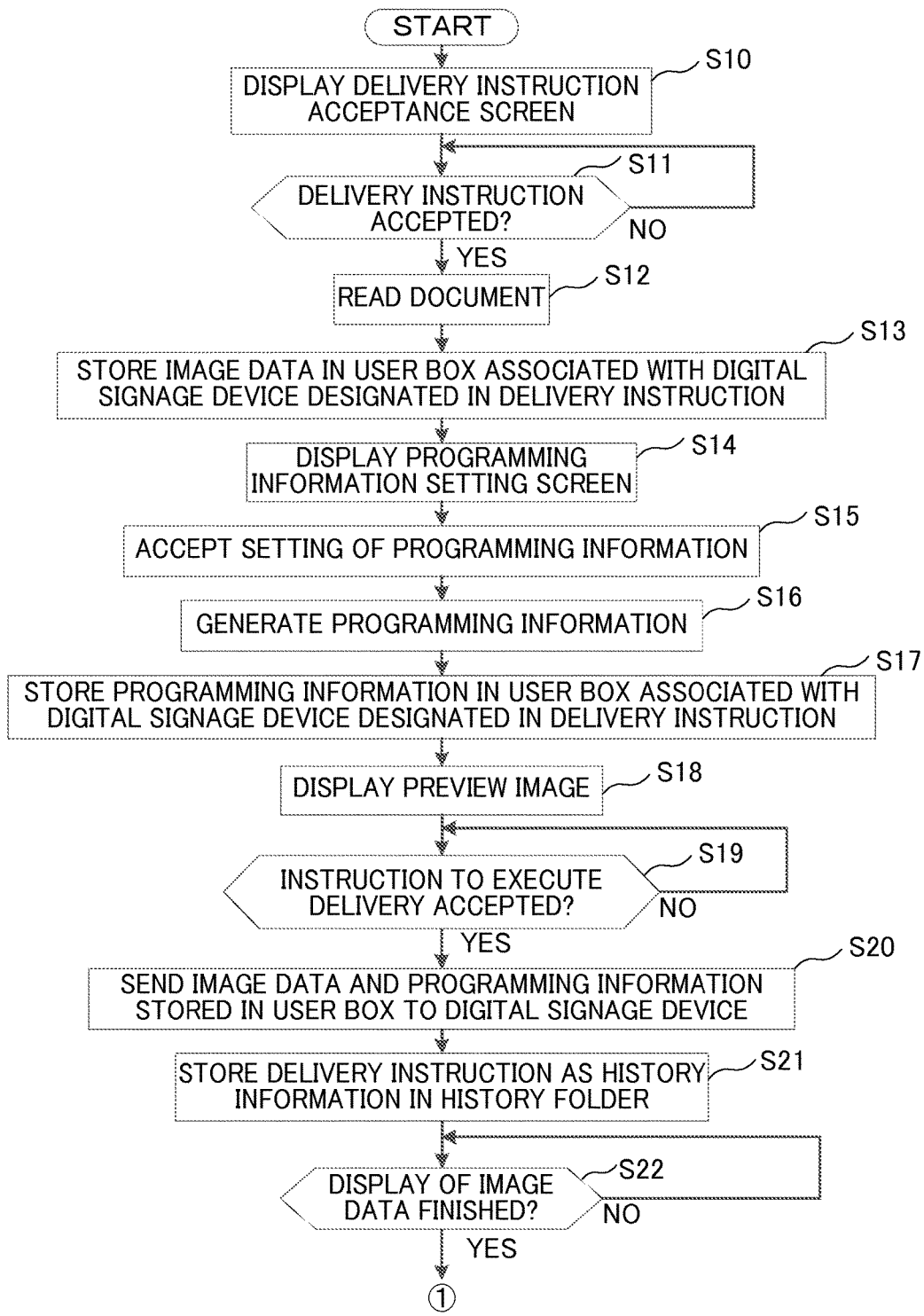
FIG. 10A is a flowchart showing a flow of processing for delivering image data in an image forming apparatus according to Modification 1.
Figure 10B:
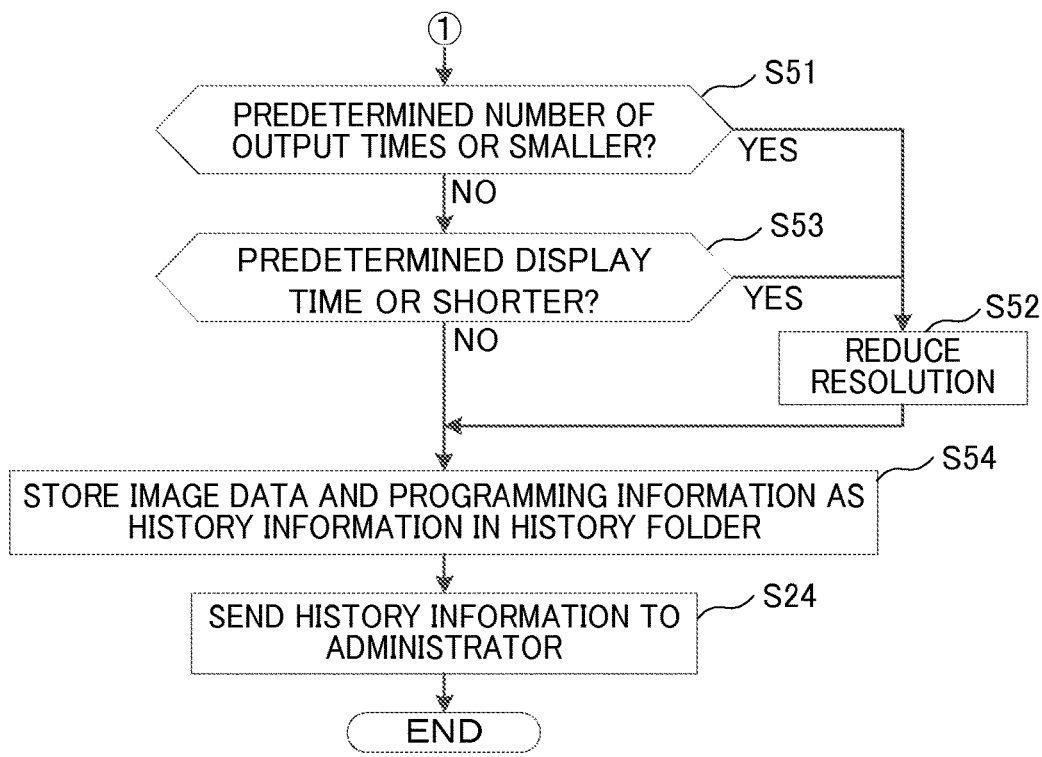
FIG. 10B is a flowchart showing a flow of processing for delivering image data in an image forming apparatus according to Modification 1.

FIGS. 10A and 10B are flowcharts showing a flow of processing for delivering image data in an image forming apparatus 10 according to Modification 1. The same pieces of processing as those shown in the flowchart of FIG. 3 are designated by the same references and further explanation thereof will be omitted.

After the relevant digital signage device 20 has finished displaying the image data (YES in step S22), the operation control section 102 analyzes the history information stored in the associated history information storage subregion to acquire the number of output times of the image data (step S51).

If the number of output times of the image data is equal to or smaller than a predetermined number of output times (YES in step S51), the operation control section 102 reduces the resolution of the image data (step S52) and allows the storage section 160 to store the resolution-reduced image data as history information in the associated history information storage subregion (step S54).

Furthermore, the operation control section 102 analyzes the programming information stored in the associated signage-specific storage region to acquire the display time of the image data, i.e., how long the image data has ever been displayed in total on the relevant digital signage device 20 (step S53).

If the display time of the image data is equal to or shorter than a predetermined amount of time (YES in step S53), the operation control section 102 reduces the resolution of the image data (step S52) and allows the storage section 160 to store a set of the resolution-reduced image data and the program information as history information in the associated history information storage subregion (step S54).

On the other hand, if the number of output times of the image data is greater than the predetermined number of output times (NO in step S51) and the display time of the image data is longer than the predetermined amount of time (NO in step S53), the operation control section 102 does not reduce the resolution of the image data and allows the storage section 160 to store a set of the image data and the program information as history information in the associated history information storage subregion (step S54).

As seen from the above, in the image forming apparatus 10 according to Modification 1, the degree of users' recognition of image data (display recognizability) indicating how much the image data is recognized by users can be determined based on information, such as the display time of the image data displayed on the digital signage device 20 or the number of output times of the image data output from the digital signage device 20. Furthermore, in the image forming apparatus 10 according to Modification 1, image data having a display recognizability lower than a predetermined degree is reduced in resolution and stored as resolution-reduced image data in the history information storage subregion, resulting in a reduced size of history information. Thus, it can be avoided that image data having a low display recognizability strains the storage capacity of the storage section 160.

Although the above description has been given of the case where the operation control section 102 determines the display recognizability based on the display time of image data displayed on a digital signage device 20 or the number of output times of image data output from the digital signage device 20, the present disclosure is not necessarily limited to this case.

For example, when the digital signage device 20 sends to the image forming apparatus 10 information on how many times users have touched a touch panel provided in the display section 210 of the digital signage device 20, the operation control section 102 may determine the display recognizability of image data using the information.

Specifically, the digital signage device 20 sends the number of touch times indicating how many times users have touched the touch panel of the display section 210 during the display of the image data. When under the control of the operation control section 102 the communication section 170 receives the number of touch times, the operation control section 102 determines whether or not the number of touch times is equal to or smaller than a predetermined number of touch times. If the number of touch times is equal to or smaller than the predetermined number of touch times, the operation control section 102 reduces the resolution of the image data and allows the storage section 160 to store the resolution-reduced image data as history information in the relevant signage-specific storage region.

Alternatively, the operation control section 102 may determine the display recognizability of image data using other types of information, such as the traffic at the location where the digital signage device 20 is installed.

<Modification 2>

FIG. 11 is a diagram schematically showing a processing flow in a digital signage system 1 according to Modification 2. Further explanation of the same elements as those shown in FIG. 4 will be omitted.

An image forming apparatus 10 according to Modification 2 includes a connection terminal capable of connecting a USB memory 40 which is a portable storage medium. Furthermore, the image forming apparatus 10 according to Modification 2 is configured to deliver image data and programming information stored in each signage-specific storage region of the storage section 160 not only by sending them via a LAN to the relevant digital signage device 20 but alternatively by outputting them to the USB memory 40 which is a portable storage medium.

When a digital signage device 20 designated in an instruction to execute delivery is not connected to a LAN or the like, the image forming apparatus 10 cannot deliver image data and programming information to the digital signage device 20. In this case, the operation control section 102 allows the USB memory 40 to store the image data and the programming information. Specifically, when the acceptance section 103 accepts the instruction to execute delivery, the operation control section 102 determines whether or not data communication with each digital signage device 20 designated in the instruction to execute delivery is possible. If the image forming apparatus 10 is unable to communicate data with the digital signage device 20 designated in the instruction to execute delivery, the operation control section 102 allows the image forming apparatus 10 to output to the USB memory 40 the image data and the programming information stored in the signage-specific storage region associated with the digital signage device 20 designated in the instruction to execute delivery. Then, the operator connects the USB memory 40 to a USB terminal of the digital signage device 20. When detecting that the USB memory 40 has been connected to the USB terminal, the control section 201 of the digital signage device 20 allows the storage section 220 to record the image data and the programming information stored in the USB memory 40. In this manner, the operator can generate and register image data and programming information on the image forming apparatus 10, even for digital signage devices 20 not connected via a LAN to the image forming apparatus 10.

Furthermore, in the image forming apparatus 10 according to Modification 2, the communication section 170 is operable to communicate data with external information processing apparatuses 30, such as a mobile terminal 30A and a PC (personal computer) 30B. In each information processing apparatus 30, image data to be displayed on the one or more digital signage devices 20 and a delivery instruction to deliver the image data are generated. The communication section 170 receives, under the control of the operation control section 102, the image data and the delivery instruction generated by the information processing apparatus 30. The operation control section 102 generates programming information based on the delivery instruction received by the communication section 170. Then, the operation control section 102 allows the storage section 160 to store the generated programming information, together with the image data, in the one or more respective signage-specific storage regions associated with the one or more digital signage devices 20 designated in the delivery instruction. Thus, the image data generated in the information processing apparatus 30 provided externally of the image forming apparatus 10 can be delivered to the one or more digital signage devices 20.

<Other Modifications>

The image forming apparatus control program described in the above embodiment and modifications may be one stored on a computer-readable non-transitory recording medium, such as a hard disk, a CD-ROM, a DVD-ROM or a semiconductor memory.

Some of the configurations shown in the above embodiment and modifications may be combined.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus comprising:

an image reading section operable to read an original document and generate image data from the read original document;

a storage section operable to store the image data generated by the image reading section;

a communication section operable to communicate data with one or more external digital signage devices;

an acceptance section configured to accept a delivery instruction to deliver the image data with the one or more digital signage devices designated as destinations; and an operation control section configured to control the operation of reading the original document and generating the image data performed by the image reading section, the operation of communicating data performed by the communication section, and the operation of storing the image data performed by the storage section, wherein the storage section has a plurality of storage regions at least one or more of which are signage-specific storage regions associated one-to-one with the one or more digital signage devices, each of the signage-specific storage regions stores the image data generated by the image reading section having read the original document, the operation control section is further configured to: when the acceptance section accepts the delivery instruction, allow the communication section to send the image data stored in the signage-specific storage region associated with the individual digital signage device designated in the delivery instruction to the digital signage device designated in the delivery instruction and allow the storage section to store the delivery instruction as history information in the associated signage-specific storage region and after the relevant digital signage device has finished displaying the image data, allow the storage section to store the image data as the history information in the associated signage-specific storage region, and wherein if a display time of the image data displayed on a relevant digital signage device is equal to or shorter than a predetermined amount of time, the operation control section reduces a resolution of the image data and allows the storage section to store the resolution-reduced image data as the history information in the associated signage-specific storage region.

2. The image forming apparatus according to claim 1, wherein the acceptance section is further configured to accept a setting of how the image data is to be displayed on the relevant digital signage device, and the operation control section is further configured to allow setting data indicating the setting accepted by the acceptance section to be stored in the associated signage-specific storage region, allow the communication section to send not only the image data but also the setting data to the relevant digital signage device, and allow the storage section to store the setting data as the history information in the associated signage-specific storage region after the relevant digital signage device has finished displaying the image data.

3. The image forming apparatus according to claim 2, wherein the acceptance section is further configured to accept at least one of the setting of a display layout of the image data, the setting of a display period of the image data, and the setting of a display order of pieces of the image data as the setting of how the image data is to be displayed on the relevant digital signage device.

4. The image forming apparatus according to claim 2, wherein the operation control section is further configured to analyze the setting data stored in the associated signage-specific storage region to determine whether or not the relevant digital signage device has finished displaying the image data.

5. The image forming apparatus according to claim 1, wherein
the acceptance section is further configured to accept an output instruction to output the image data stored in the one or more storage regions associated one-to-one with the one or more digital signage devices, and the operation control section is further configured to, when the acceptance section accepts the output instruction, perform at least one of processing for allowing an image forming section provided in the image forming apparatus to form an image on a recording paper sheet based on the image data indicated in the output instruction and processing for allowing the communication section to send an e-mail to which the image data indicated in the output instruction is attached.

6. The image forming apparatus according to claim 5, wherein if a number of output times of the image data indicated by the output instruction is equal to or smaller than a predetermined number of output times, the operation control section reduces a resolution of the image data and allows the storage section to store the resolution-reduced image data as the history information in the associated signage-specific storage region.

7. The image forming apparatus according to claim 1, wherein the operation control section is further configured to allow the storage section to store the history information in a history information storage subregion provided in the associated signage-specific storage region.

8. The image forming apparatus according to claim 1, wherein the operation control section is further configured to allow the communication section to send to a predetermined destination the history information stored in the associated signage-specific storage region.

9. The image forming apparatus according to claim 1, wherein
the acceptance section is further configured to accept a generation instruction to generate a signage-specific storage region associated with one of the one or more digital signage devices, and the image forming apparatus further comprises a storage region generating section configured to, when the acceptance section accepts the generation instruction, generate the signage-specific storage region associated with the digital signage device in the storage section.

10. The image forming apparatus according to claim 1, wherein the operation control section is further configured to allow a display section of the image forming apparatus to display a preview image indicating the image data to be displayed on the relevant digital signage device based on the setting accepted by the acceptance section.

11. An image forming apparatus comprising: an image reading section operable to read an original document and generate image data from the read original document;
a storage section operable to store the image data generated by the image reading section;
a communication section operable to communicate data with one or more external digital signage devices;
an acceptance section configured to accept a delivery instruction to deliver the image data with the one or more digital signage devices designated as destinations; and
an operation control section configured to control the operation of reading the original document and generating the image data performed by the image reading section, the operation of communicating data performed by the communication section, and the operation of storing the image data performed by the storage section,
wherein the storage section has a plurality of storage regions at least one or more of which are signage-specific storage regions associated one-to-one with the one or more digital signage devices,
each of the signage-specific storage regions stores the image data generated by the image reading section having read the original document,
the operation control section is further configured to, when the acceptance section accepts the delivery instruction, allow the communication section to send the image data stored in the signage-specific storage region associated with the individual digital signage device designated in the delivery instruction to the digital signage device designated in the delivery instruction and allow the storage section to store the delivery instruction as history information in the associated signage-specific storage region,
the communication section is further configured to receive from a relevant digital signage device a number of touch times indicating how many times a touch panel provided in the digital signage device has been touched while the digital signage device displays the image data, and
if the number of touch times received by the communication section is equal to or smaller than a predetermined number of touch times, the operation control section reduces a resolution of the image data and allows the storage section to store the resolution-reduced image data as the history information in the associated signage-specific storage region.

12. An image forming apparatus comprising: an image reading section operable to read an original document and generate image data from the read original document;
a storage section operable to store the image data generated by the image reading section;
a communication section operable to communicate data with one or more external digital signage devices;

an acceptance section configured to accept a delivery instruction to deliver the image data with the one or more digital signage devices designated as destinations; and an operation control section configured to control the operation of reading the original document and generating the image data performed by the image reading section, the operation of communicating data performed by the communication section, and the operation of storing the image data performed by the storage section, wherein the storage section has a plurality of storage regions at least one or more of which are signage-specific storage regions associated one-to-one with the one or more digital signage devices, each of the signage-specific storage regions stores the image data generated by the image reading section having read the original document, the operation control section is further configured to, when the acceptance section accepts the delivery instruction, allow the communication section to send the image data stored in the signage-specific storage region associated with the individual digital signage device designated in the delivery instruction to the digital signage device designated in the delivery instruction and allow the storage section to store the delivery instruction as history information in the associated signage-specific storage region, the communication section is further operable to communicate data with an external information processing apparatus and is configured to receive from the information processing apparatus the delivery instruction and the image data to be delivered based on the delivery instruction, and the operation control section is further configured to, when the communication section receives the delivery instruction, allow the storage section to store the image data received by the communication section in the signage-specific storage region associated with the individual digital signage device designated in the delivery instruction received by the communication section and allow the communication section to send the image data stored in the associated signage-specific storage region to the digital signage device.

13. A computer-readable non-transitory recording medium with an image forming apparatus control program recorded thereon, the image forming apparatus control program allowing a computer to function as:

an operation control section configured to control an image reading operation of an image reading section, a communication operation of a communication section capable of communicating data with one or more external digital signage devices, and a storage operation of a storage section having a plurality of storage regions at least one or more of which are signage-specific storage regions associated one-to-one with the one or more digital signage devices, each of the signage-specific storage regions storing image data generated by the image reading section having read the original document; and an acceptance section configured to accept a delivery instruction to deliver the image data with the one or more digital signage devices designated as destinations, wherein the image forming apparatus control program further allows the computer to function so that:

when the acceptance section accepts the delivery instruction, the operation control section allows the communication section to send the image data stored in the signage-specific storage region associated with the individual digital signage device designated in the delivery instruction to the digital signage device designated in the delivery instruction and allows the storage section to store the delivery instruction as history information in the associated signage-specific storage region;

after a relevant digital signage device has finished displaying the image data, allow the storage section to store the image data as the history information in the associated signage-specific storage region; and if a display time of the image data displayed on the relevant digital signage device is equal to or shorter than a predetermined amount of time, the operation control section reduces a resolution of the image data and allows the storage section to store the resolution-reduced image data as the history information in the associated signage-specific storage region.

* * * * *